(12) United States Patent
Varanasi et al.

(10) Patent No.: US 11,140,142 B2
(45) Date of Patent: Oct. 5, 2021

(54) METHOD AND SYSTEM FOR AUTHENTICATION

(71) Applicant: salesforce.com, inc., San Francisco, CA (US)

(72) Inventors: Chandra Sekhar Varanasi, Hyderabad (IN); Puneet Kumar Dawer, Hyderabad (IN); Neelamani Durga Siva Prasad Kolluru, Hyderabad (IN); Rama Krishnam Raju Chekuri, Hyderabad (IN); Amrendra Singh, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 307 days.

(21) Appl. No.: 16/256,611

(22) Filed: Jan. 24, 2019

(65) Prior Publication Data

US 2020/0244636 A1   Jul. 30, 2020

(51) Int. Cl.
*H04L 29/06* (2006.01)
*G06F 21/45* (2013.01)
*H04L 9/32* (2006.01)

(52) U.S. Cl.
CPC .............. *H04L 63/08* (2013.01); *G06F 21/45* (2013.01); *H04L 9/3236* (2013.01); *H04L 63/0428* (2013.01)

(58) Field of Classification Search
CPC ............ H04L 63/0428; H04L 63/0435; H04L 63/045; H04L 63/08; H04L 63/083; H04L 63/105; H04L 63/12; H04L 9/32; H04L 9/3226; H04L 9/3271; H04L 9/08; H04L 9/0861; H04L 9/0863; H04L 9/088; G06F 21/45
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |

(Continued)

*Primary Examiner* — Kristine L Kincaid
*Assistant Examiner* — Shaqueal D Wade
(74) *Attorney, Agent, or Firm* — Dergosits & Noah LLP; Todd A. Noah

(57) ABSTRACT

Systems and methods for performing authentication may include encrypting, by a server computing system, a question based on a first password associated with a user and based on successful verification of user identification to generate an encrypted question; transmitting, by the server computing system, the encrypted question to a user computing system; receiving, by the server computing system, an encrypted response from the user computing system, the encrypted response associated with the encrypted question; decrypting, by the server computing system, the encrypted response based on the first password to generate a response; and establishing, by the server computing system, a login session with the user computing system based on successful verification of the response.

20 Claims, 11 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,855,473 B1 * | 12/2020 | Griffin ............... H04L 9/0866 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0250473 A1 * | 11/2005 | Brown ............... H04L 9/3226 455/411 |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2010/0122340 A1 * | 5/2010 | Chow ............... G06F 21/46 726/18 |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0101451 A1 * | 4/2014 | Chan ............... H04L 67/1095 713/171 |
| 2014/0101738 A1 * | 4/2014 | Sama ............... H04L 63/083 726/6 |
| 2014/0359537 A1 | 12/2014 | Jakobsen et al. |
| 2015/0007050 A1 | 1/2015 | Jakobsen et al. |
| 2015/0095162 A1 | 4/2015 | Jakobson et al. |
| 2015/0172563 A1 | 6/2015 | Jakobson et al. |

* cited by examiner

METHOD AND SYSTEM FOR AUTHENTICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to authentication.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Generally, authentication in data processing may involve a server computing system requesting a user to provide some confidential information to enable the system to authenticate the user. The confidential information may be in the form of user identification (ID) and password transmitting from the user to the system over a network. Passing the confidential information over a network may expose the information to attacks by hackers. For example, the hackers may attack or intercept the confidential information as the confidential information is being transmitted between a user computing system and the server computing system, without the user and the server computing system having any awareness of the fact that the confidential information has been compromised.

BRIEF SUMMARY

For some embodiments, systems and methods for authentication may include, encrypting, by a server computing system, a question based on a first password associated with a user and based on successful verification of user identification to generate an encrypted question; transmitting, by the server computing system, the encrypted question to a user computing system; receiving, by the server computing system, an encrypted response from the user computing system, the encrypted response associated with the encrypted question; decrypting, by the server computing system, the encrypted response based on the first password to generate a response; and establishing, by the server computing system, a login session with the user computing system based on successful verification of the response. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1A:
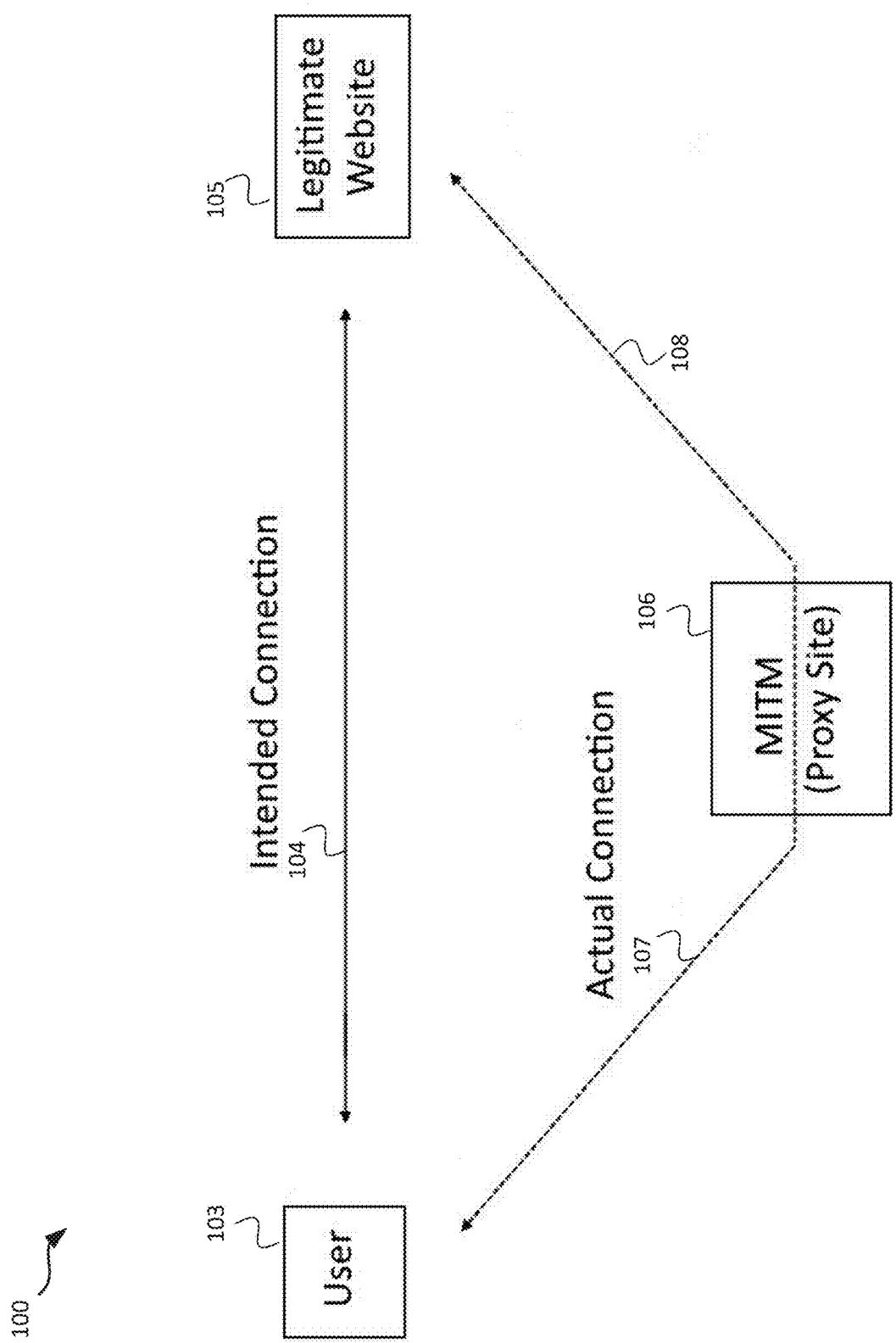
FIG. 1A shows a diagram of an example MITM attack.

Systems and methods for authentication based on second level verification are disclosed. The authentication may be associated with a login request. A second level question may be encrypted based on a user's password and transmitted from a server computing system to a user computing system. An encrypted response to the second level question may be received by the server computing system from the user computing system. The encrypted response may be based on the user's password.

The systems and methods associated with authentication will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a method for authentication may include encrypting, by a server computing system, a question based on a first password associated with a user and based on successful verification of user identification to generate an encrypted question; transmitting, by the server computing system, the encrypted question to a user computing system; receiving, by the server computing system, an encrypted response from the user computing system, the encrypted response associated with the encrypted question; decrypting, by the server computing system, the encrypted response based on the first password to generate a response; and establishing, by the server computing system, a login session with the user computing system based on successful verification of the response.

The disclosed embodiments may include a system for performing authentication and may include one or more processors, and a non-transitory computer readable medium storing a plurality of instructions, which when executed, cause the one or more processors of a server computing to encrypt a question based on a first password associated with a user and based on successful verification of user identification to generate an encrypted question; transmit the encrypted question to a user computing system; receive encrypted response from the user computing system, the encrypted response associated with the encrypted question; decrypt the encrypted response based on the first password to generate a response; and establish a login session with the user computing system based on successful verification of the response.

The disclosed embodiments may include a computer program product comprising computer-readable program code to be executed by one or more processors of a server computing system when retrieved from a non-transitory computer-readable medium, the program code including instructions to encrypt a question based on a first password associated with a user and based on successful verification of user identification to generate an encrypted question; transmit the encrypted question to a user computing system; receive encrypted response from the user computing system, the encrypted response associated with the encrypted question; decrypt the encrypted response based on the first password to generate a response; and establish a login session with the user computing system based on successful verification of the response.

While one or more implementations and techniques are described with reference to an embodiment relating to authentication implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Some embodiments of the present invention may include methods and systems for authentication. The methods and systems may also enable users to establish login sessions with a server computing system while reducing the risk of exposing their passwords to hackers. The methods and systems may include using encryption and decryption based on a user's password. A hash function may be used to generate hashed password for improved security. Second level verification may be used for authentication.

FIG. 1A shows a diagram of an example of man in the middle (MITM) attack. In diagram 100, user 103 may intend to establish a connection with a legitimate website 105 using the Internet via connection 104. However, the address used by the user 103 may not be a correct address to the legitimate website 105 and may instead be an address to proxy site maintained by a hacker 106. The proxy site may be located in between the user 103 and the legitimate website 105. The proxy site may be connected with the user 103 via the actual connection 107. Believing incorrectly that the connection 104 was established, the user 103 may transmit confidential information to the proxy site. After the confidential information is intercepted via the actual connection 107, the proxy site may relay or transmit the confidential information to the legitimate website 105 via connection 108. The legitimate website 105 receives the confidential information believing that it was sent directly from the user 103. Confidential information may also be intercepted when using a public Wi-Fi connection. Information sent from a user computing system to the Wi-Fi router may be intercepted by hackers connecting to the same Wi-Fi router.

The MITM attack may enable hackers to intercept login information, financial information such as bank account information and credit card information, etc. The intercepted confidential information may be used by the hacker 106 to establish connection with the legitimate website 105 pretending to be the user 103 and stealing the user's identity.

One solution to preventing the MITM attack is to use an SSL (Secure Sockets Layer) certificate. The SSL certificate creates a secure link between a website and a user's browser. An SSL certificate authenticates the identity of a website and encrypts information sent to the server using SSL technology. If the identify of a website cannot be authenticated, connection to such a site may be denied. One problem with this solution is the lack of knowledge of users about certificate authentication. This may lead to the users accepting or bypassing warnings about certificate authentication causing the MITM attacks to occur. Further, a hacker may register a certificate of the proxy site as a trusted site preventing the browser associated with the user's computing system to deny the connection.

Figure 1B:
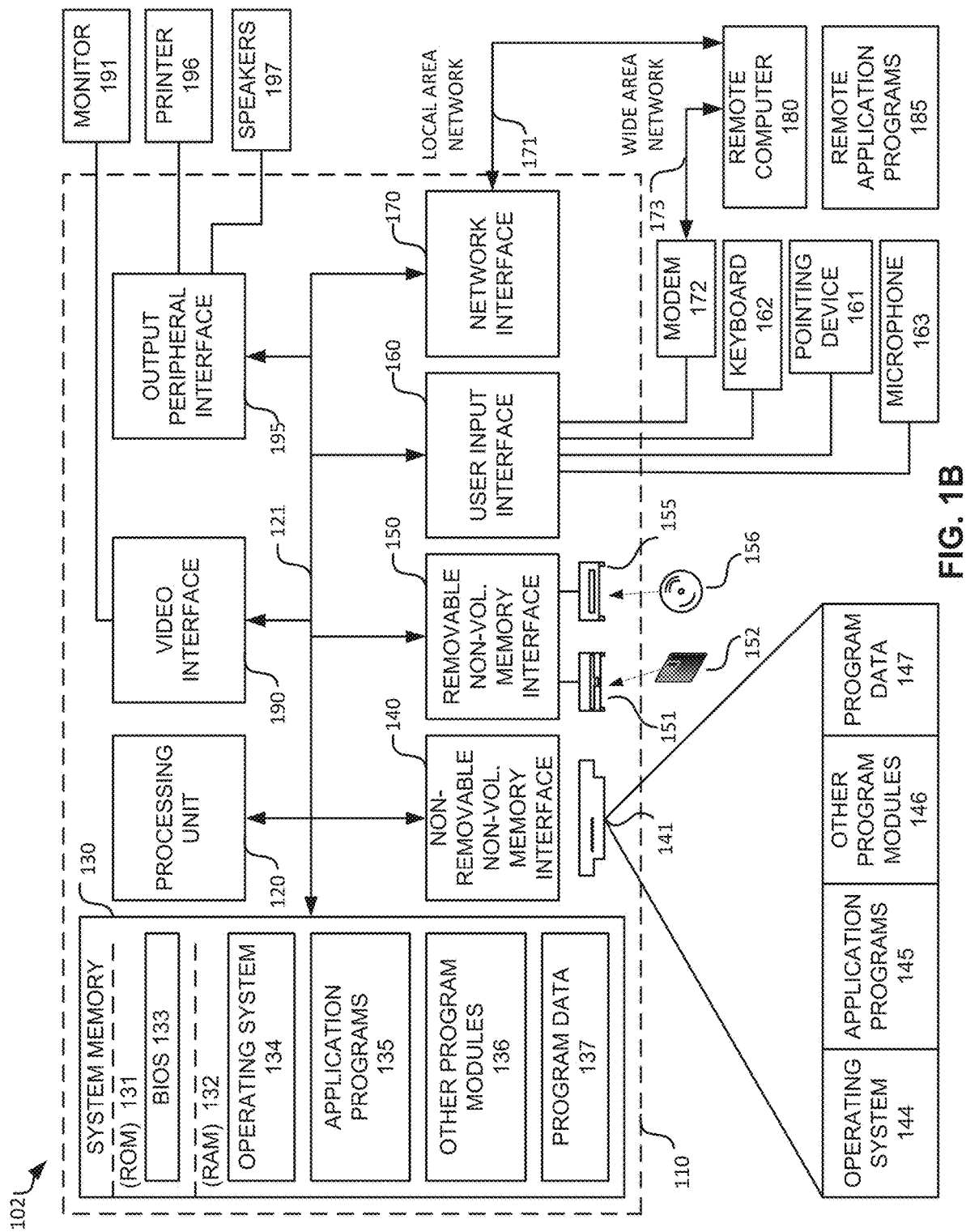
FIG. 1B shows a diagram of an example computing system that may be used with some embodiments.

FIG. 1B is a diagram of an example computing system that may be used with some embodiments of the present invention. In diagram 102, computing system 110 may be used by a user (e.g., user 103 shown in FIG. 1A) to establish a connection with a server computing system or to a website (e.g., website 105 shown in FIG. 1A) hosted by a server computing system.

The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1B, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1B also illustrates operating system 134, application programs 135, other program modules 136, and program data 137.

The computing system 110 may also include other removable/non-removable volatile/nonvolatile computer storage media. By way of example only, FIG. 1B also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B, provide storage of computer readable instructions, data structures, program modules and other data for the computing system 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1B illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
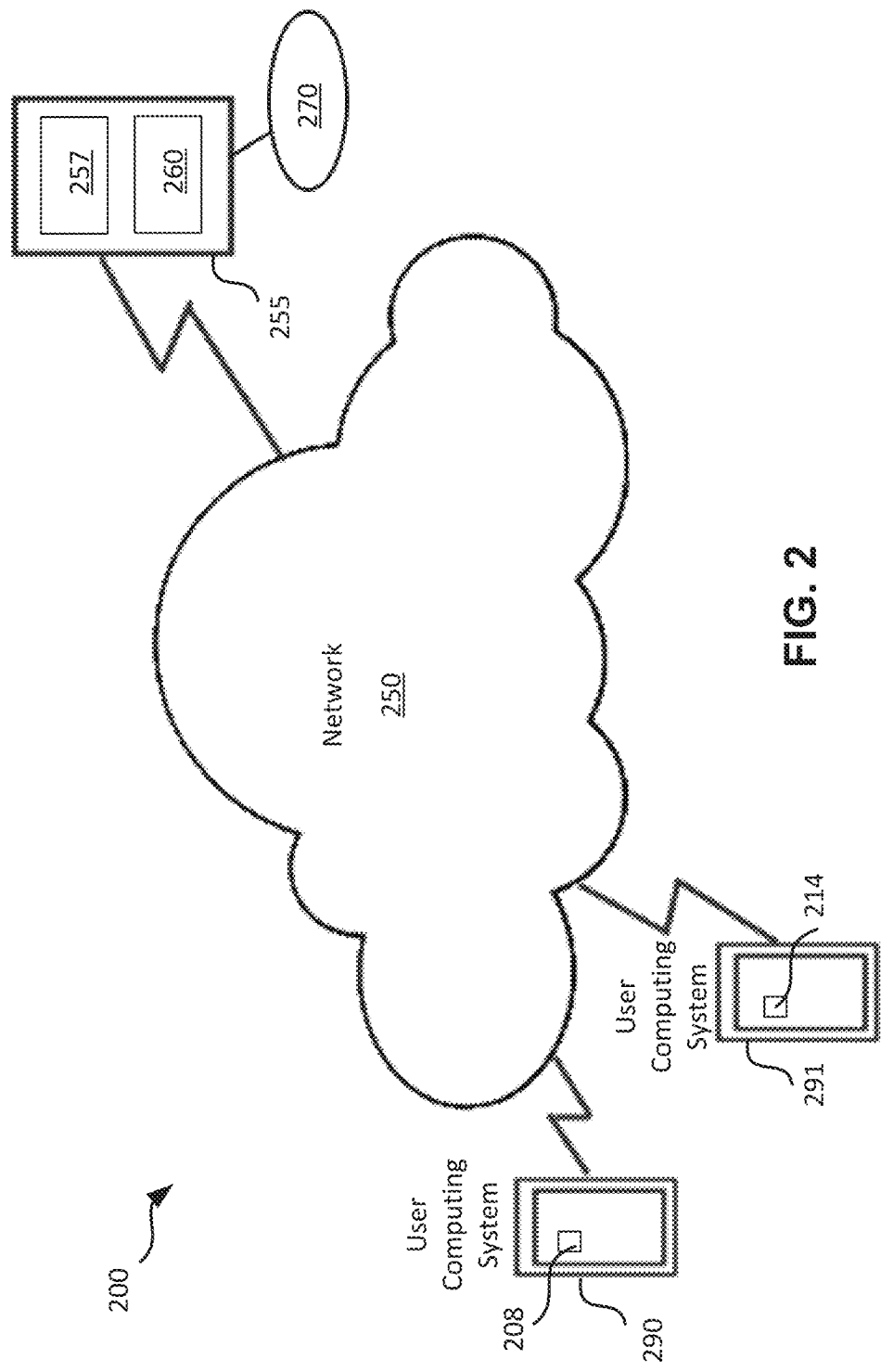
FIG. 2 shows a diagram of an example network environment that may be used with some embodiments.

FIG. 2 shows a diagram of an example network environment that may be used with some embodiments of the present invention. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270. Each of the computing systems 290 and 291 may include an application module such as module 208 or 214. For example, a user may use the computing system 290 and the application module 208 to connect to and communicate with the server computing system 255 and log into application 257 (e.g., a Salesforce.com® application).

For some embodiments, the application 257 may be associated with authentication application 260 configured to perform encryption and decryption of messages transmitted to and received from the computing systems 290 or 291. The encryption and decryption may be performed using a secret key stored in the database 270. There may be a unique secret key associated with each user. For some embodiments, a secret key may be associated with a login password setup by the user during an initial registration with the application 257. For some embodiments, the functions of the authentication application 260 may be incorporated into the application 257.

Figure 3:
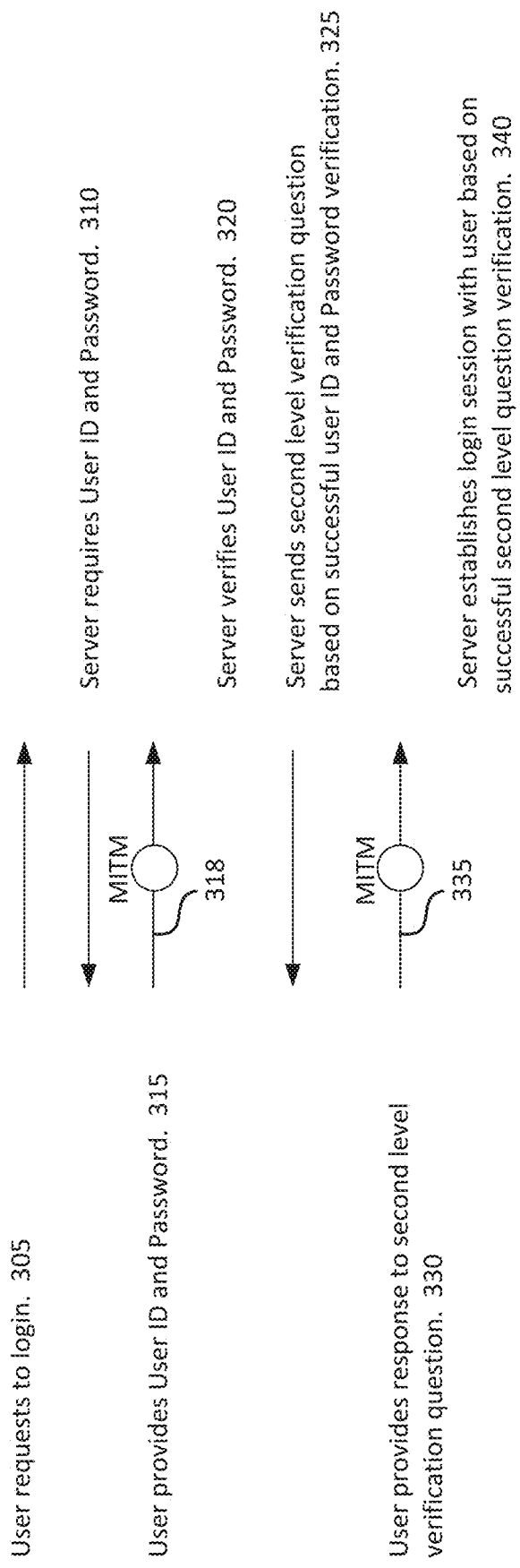
FIG. 3 shows an example login flow that includes a second level verification, in accordance with some embodiments.

FIG. 3 shows an example login flow that includes a second level verification, in accordance with some embodiments. Prior to a user initiating a login request, a user ID and a password associated with the user have already been established, for example, via a registration process. In this example, a second level verification may be used to enable further authentication of the user beyond the login ID and password. For example, a second level verification may involve a user providing a response to a question where the response was previously provided by the user and stored in a database associated with the server computing system.

The login flow may start with operation 305 where a user (e.g., user 103) initiates a request to log in to the server computing system (e.g., server computing system 255. In operation 310, the server computing system 255 may then request the user 103 to provide user ID and password information. In operation 315, the user ID and password information is transmitted from the user to the server computing system. When there is a MITM attack, the user ID and password information may be intercepted along path 318. In operation 320, the server computing system verifies the user ID and password information. When a second level verification is required, the server computing system may send a second level question to the user (via user computing system) in operation 325 based on successful verification of the user ID and password information. In operation 330, the user may send a response to the second level question to the server computing system. When there is a MITM attack, the response to the second level question may be intercepted along path 335. In operation 340, the server computing system may enable a login session with the user based on successful second level question verification after the user ID, password and response to the second level question already intercepted by the MITM attack.

Figure 4:
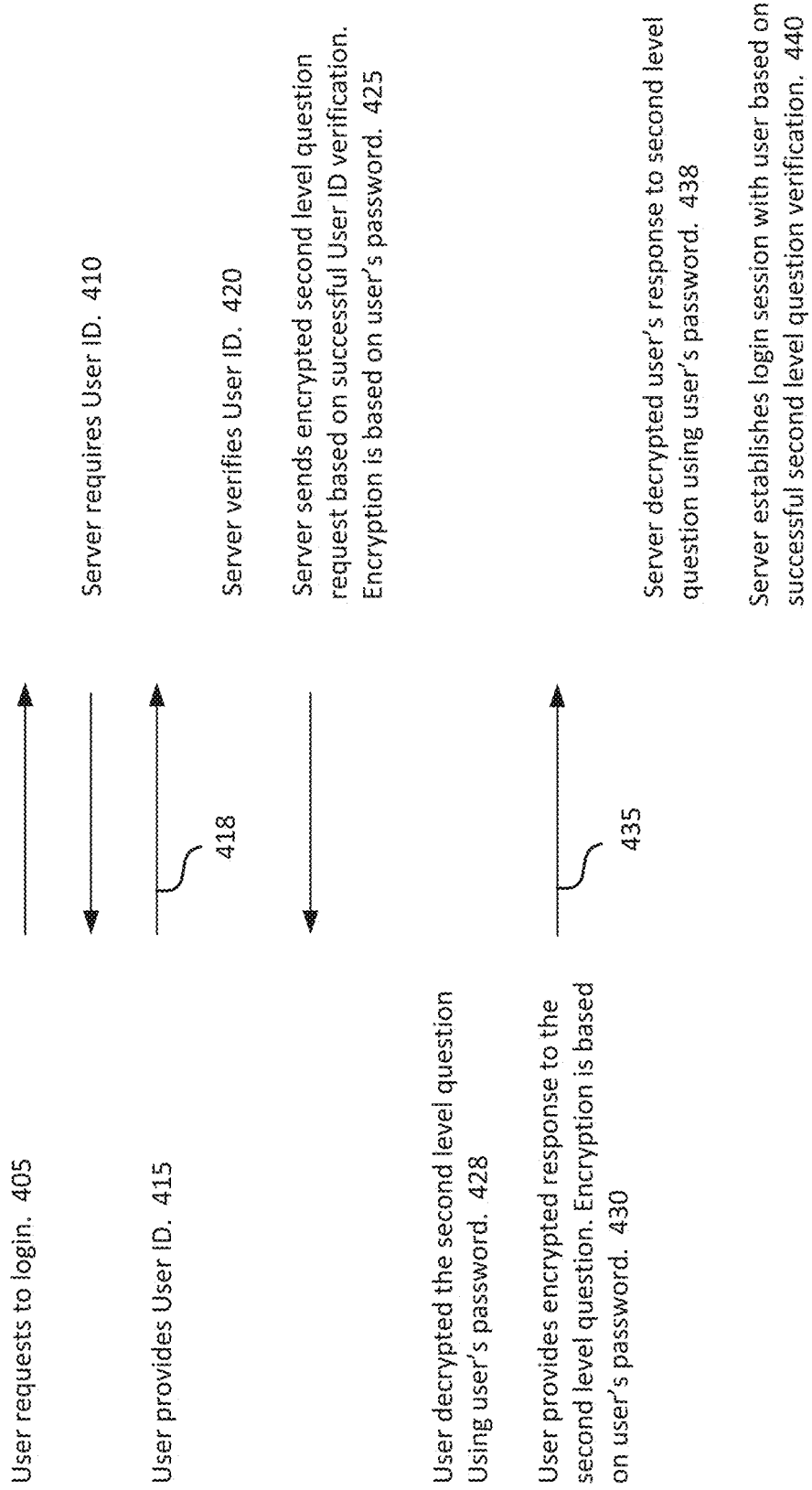
FIG. 4 shows an example login flow that uses encryption, in accordance with some embodiments.

FIG. 4 shows an example login flow that uses encryption, in accordance with some embodiments. Similar to the flow in FIG. 3, a user ID and a password associated with the user may have already been established, for example, via a registration process. The login flow may start with operation 405 where a user (e.g., user 103) initiates a request to log in to the server computing system (e.g., server computing system 255. In operation 410, the server computing system 255 may then request the user 103 to provide user ID information. It may be noted that there is no request for the user to provide the password information, thus preventing the user's password from being intercepted by any MITM attack.

In operation 415, the user ID is transmitted from the user to the server computing system. When there is a MITM attack, it may be possible that the user ID may be intercepted along path 418 but no user password is compromised. In operation 420, the server computing system verifies the user ID. When a second level verification is required, the server computing system may send a second level question to the user (via user computing system) in operation 425 based on successful verification of the user ID. The second level question may be encrypted based on a stored user's password. Since the second level question is encrypted, it is not exposed to the MITM attack.

In operation 428, the user may decrypt the second level question based on the user's password. In operation 430, the user may send a response to the second level question to the server computing system. The response may be encrypted based on the user's password. Since the response to the second level question is encrypted, it is not exposed to the MITM attack along path 435. In operation 438, the server computing system may decrypt the response to the second level question based on the user's password. In operation 440, the server computing system may enable a login session with the user based on successful second level question verification. It may be noted that operations 305 and 310 of FIG. 3 and operations 405 and 410 of FIG. 4 are shown for illustrative purposes only and may not be necessary in some login situations.

Figure 5A:
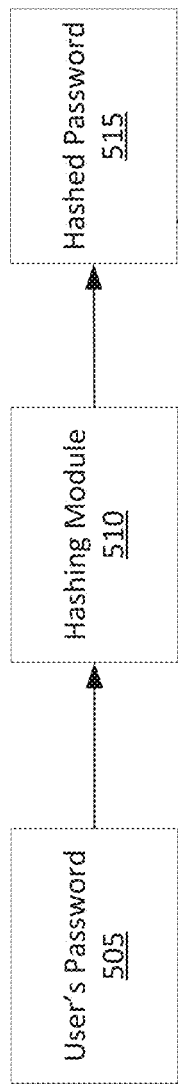
FIGS. 5A, 5B and 5C show example diagrams of hashing, encryption and decryption, in accordance with some embodiments.
Figure 5B:
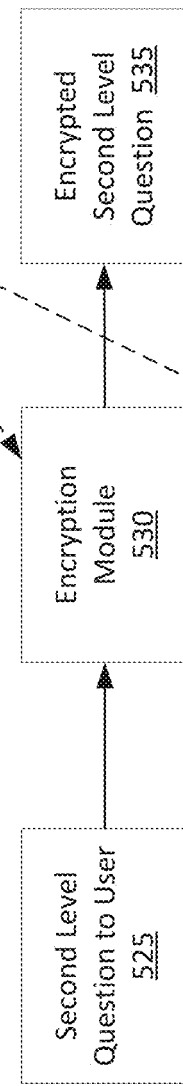
Figure 5C:
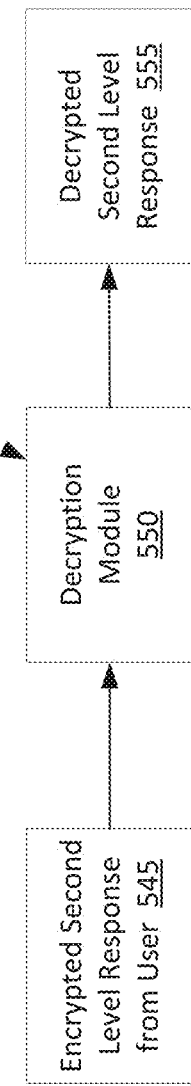

FIGS. 5A, 5B and 5C show example diagrams of hashing, encryption and decryption, in accordance with some embodiments. For some embodiments, the user's password stored by the server computing system may be hashed. Password hashing may guard against the possibility that hackers who obtain unauthorized access to the database can retrieve the passwords of every user in the system. Referring to FIG. 5A, the user's password 505 may be stored in a database associated with the server computing system. For security, instead of storing an original password, a hashed password may be stored. The hashing module 510 may perform a one-way transformation on the password 505 and transform the password 505 into the hashed password 515. Unlike a typical password, a hashed password may be a string of 60 characters or more and may not be easily discernable. For some embodiments, a salt may be used together with the user's password. The salt may be appended to the user's password and a hashing function (e.g., bcrypt, scrypt, PBKDF2, etc.) may be used to generate the hashed password. This may further protect the user's password against hackers that try to predict the user's password to find matching hashed password.

Referring to FIG. 5B, when there is a second level question 525, the second level question 525 may be encrypted by encryption module 530 to generate encrypted second level question 535. The encryption may be performed using the hashed password 515. The dashed line 560 is shown to illustrate using the hashed password 515 as the encryption key. Encrypting the second level question may prevent hackers from intercepting the question when the question is transmitted from the server computing system to the user computing system.

For some embodiments, a response provided by a user to a second level question may also be encrypted before being transmitted to the server computing system. Referring to FIG. 5C, the encrypted response to the second level question 545 may be decrypted by the decryption module 550 at the server computing system to generate a decrypted second level response 555. The decryption may be performed using the hashed password 515. The dashed line 565 is shown to illustrate using the hashed password 515 as the decryption key. It may be noted that even though the examples refer to a second level question, the solution is not limited to one second level question.

Figure 6:
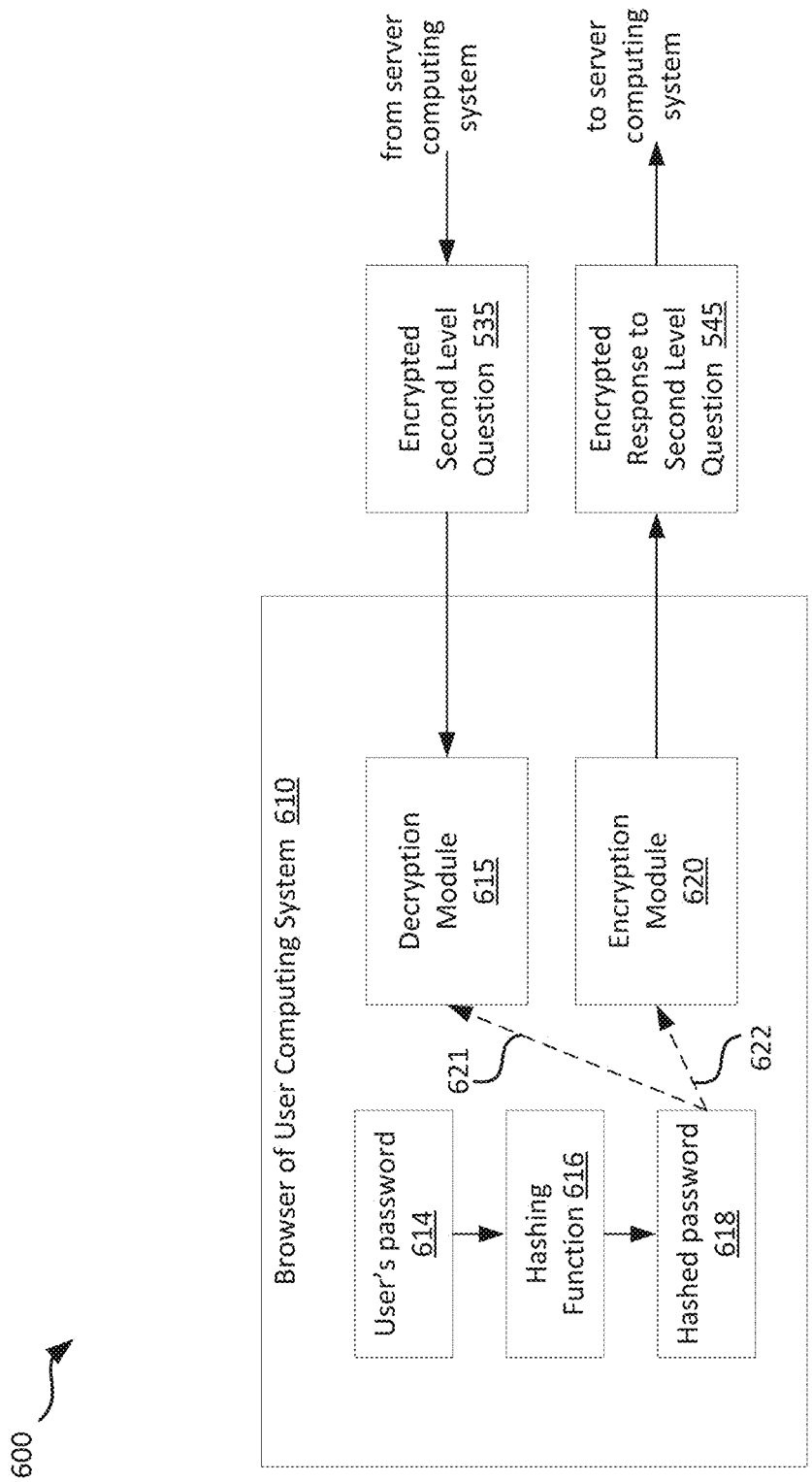
FIG. 6 is a diagram of example browser associated with a user computing system, in accordance with some embodiments.

FIG. 6 is a diagram of example browser associated with a user computing system, in accordance with some embodiments. For some embodiments, a browser may be configured to accommodate receiving encrypted second level question from a server computing system, decrypting the second level question, and encrypting a response to the second level question. As shown in diagram 600, browser 610 may be configured to store the user's password 614. For example, with the Chrome browser, a user's password may be stored in the directory chrome://settings/passwords. The browser 610 may also be configured to perform a hash function on the user's password 614. For some embodiments, the browser 610 may use the same hash function 616 as the hash function used by the server computing system. If a salt is used for hashing at the server computing system to create the hashed password 515 (shown in FIG. 5A), the same salt may be used by the hash function 616 to generate the hashed password 618.

The hashed password 618 may be used by the decryption module 615 (illustrated as the hyphenated line 621) to decrypt the second level question received from the server computing system. The hashed password 618 may also be used by the encryption module 620 (illustrated as the hyphenated line 622) to encrypt a response to the second level question. The encrypted response may then be transmitted to the server computing system. As shown in FIG. 5C, when the server computing system is able to successfully decrypt the response to the second level question using the hashed password 515, the server computing system is able to verify that the password used by the user is the same as the password known to the server computing system. Further, the server computing system is also able to verify the accuracy of the response to the second level question provided by the user. For some embodiments, functions may be added to a browser such as browser 610 via extensions. Encryption and decryption functions based on hashed passwords may be added as extension to the browser 610. Similarly, hashing function using a salt and a password to generate a hashed password may be added as an extension to the browser 610.

Following is an example script written in JavaScript to perform a login authentication using hashed password and second level questions. In this script example, the hashing function is performed using "CryptoJS.SHA256", the valid user name or userID is "demo", and there are two second level questions.

```
<body>
<script src="https://cdnjs.cloudflare.com/ajax/libs/crypto-js/3.1.2/rollups/aes.js"></script>
<script src="https://cdnjs.cloudflare.com/ajax/libs/crypto-js/3.1.9-1/sha256.js"></script>
<script language="javascript">
function check( ) {
var pwd_hash = CryptoJS.SHA256(document.getElementById("pass1").value);
pwd_hash = pwd_hash.toString( ).toUpperCase( );
var username = document.getElementById("username1").value;
var encQ1 = "";
var encQ2 = "";
var proceedNextStep = false;
if(username == "demo") {
// Hardcoded second level questions below for demo purpose
encQ1 =
"U2FsdGVkX1+DjKBF2/in8fTcPpHbRbynFPArLNLSV9Vbb/qY0kpLuP43xDGwsfCaLyl
0uz6TeXuyk5vywrDJWA==";
encQ2 =
"U2FsdGVkX19I/qEH0PJPWoKuGpt2dCAr2j0mi2aGCOrYAdl4KuR4fF690zfpoA5A";
proceedNextStep = true;
}
else {
var url = "https://abcbank.com/get2fa"
var data = {"username": username}
try {
fetch(url, {
method: 'POST',
body: data,
headers:}
'Content-Type': 'application/json'
}
}).then(function(response) {
if(response.ok) {
encQ1 = response.json( )["question1"];
encQ2 = response.json( )["question2"];
proceedNextStep = true;
} else {
console.log("Error from server");
}
})
}
catch(e) {
console.log(e);
}
}
if(proceedNextStep) {
try {
var question1 = (CryptoJS.AES.decrypt(encQ1, pwd_hash)).toString(CryptoJS.enc.Utf8);
var question2 = (CryptoJS.AES.decrypt(encQ2, pwd_hash)).toString(CryptoJS.enc.Utf8);
if(question1 && question2) {
sessionStorage.setItem("question1",question1);
sessionStorage.setItem("question2",question2);
sessionStorage.setItem("password", pwd_hash);
sessionStorage.setItem("username", username);
window.location.href="2fa.html";
} else {
console.log("Login failed");
window.location.href="error.html";
}
}
catch(e) {
alert(e);
}
} else {
window.location.href="error.html";
}
}
</script>
</body>
```

Following is an example script written in JavaScript to enable a user to provide responses to two second level questions requested by the server computing system. In this script example, the responses will be encrypted using a hashed password. The server computing system may decrypt the responses using hashed password stored in its DB. If the responses match with expected responses, a login session may be established.

```
<body onload="getQuesti
    <body>
    <script language="javascript">
    function getQuestions( ) {
    document.getElementById('question1').innerHTML =
    sessionStorage.getItem("question1");
    document.getElementById('question2').innerHTML =
    sessionStorage.getItem("question2");
    }
    function process( ) {
    //Below condition just for demo purpose without server
    var username = sessionStorage.getItem("username");
    if(username == "demo") {
    if(document.getElementById("answer1").value == "demo" &&
    document.getElementById("answer2").value == "demo") {
    //Allowing user to login for demo purpose
    sessionStorage.loggedIn = "true";
    window.location.href="profile.html";
    } else {
    sessionStorage.loggedIn = "false";
    window.location.href="error.html";
    }
    }
    else {
    try {
    var url = "https://abcbank.com/authenticate"
    var password = sessionStorage.getItem("password");
    var encAnswer1 =
    CryptoJS.AES.encrypt(document.getElementById("answer1").value, password);
    var encAnswer2 =
    CryptoJS.AES.encrypt(document.getElementById("answer2").value, password);
    var data = {"username": username, "answer1":encAnswer1,
    "answer2":encAnswer2}
    fetch(url, {
    method: 'POST',
    body: data,
    headers:{
    'Content-Type': 'application/json'
    }
    }).then(function(response) {
    //Server will decrypt the answers using user's password hash
    stored in its DB.
    //If answers are matched, login will be successful
    if(response.ok) {
    sessionStorage.loggedIn = "true";
    } else {
    sessionStorage.loggedIn = "false";
    window.location.href="error.html";
    }
    });
    }
    catch(e) {
    sessionStorage.loggedIn = "false";
    console.log(e);
    window.location.href="error.html";
    }
    }
    }
    </script>
    <div class="limiter">
    <div class="container-login100">
    <div class="wrap-login100 p-t-85 p-b-20">
    <span class="login100-form-title p-b-70">
    2fa Security Questions
    </span>
    <div class="wrap-input100 validate-input m-t-85 m-b-35">
    <span class="txt2" id="question1">
    Question1?
```

```
    </span>
    <input class="input100" type="text" name="answer1"
    id="answer1">
    </div>
    <div class="wrap-input100 validate-input m-b-50">
    <span class="txt2" id="question2">
    Question2?
    </span>
    <input class="input100" type="text" name="answer2"
    id="answer2">
    </div>
    <div class="container-login100-form-btn">
    <button class="login100-form-btn" onclick="process( )"
    value="Submit Answers">
    Submit Answers
    </button>
    </div>
    </div>
    </div>
    </div>
    </body>
```

Figure 7:
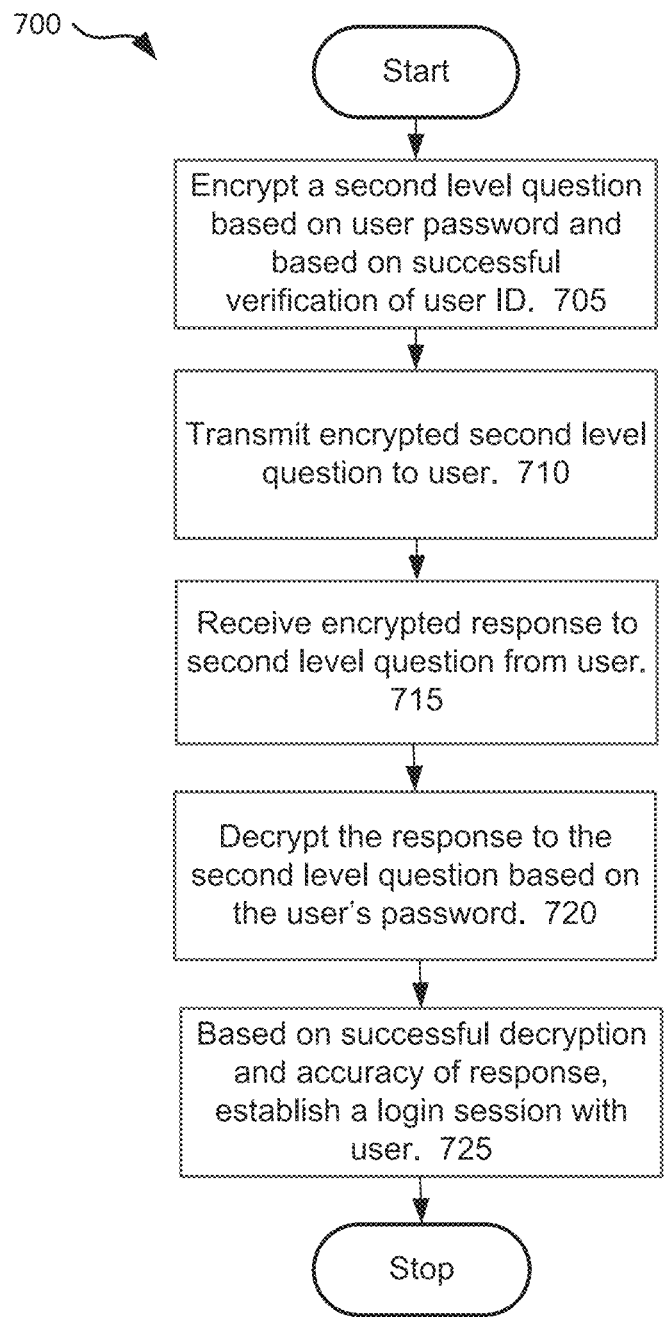
FIG. 7 is an example flow diagram of an authentication process that may be performed by a server computing system, in accordance with some embodiments.

FIG. 7 is an example flow diagram of an authentication process that may be performed by a server computing system, in accordance with some embodiments. Although not shown in flow diagram 700, a user ID or user name and password have been established for login purposes. A login request has been initiated, and a user ID or username has been transmitted to the server computing system as part of the login request.

At block 705, based on successful verification of the user ID, the server computing system may encrypt a second level question based on the password. At block 710, the encrypted second level question may be transmitted to the user via the user computing system. At block 715, an encrypted response to the second level question may be received by the server. At block 720, the server computing system may decrypt the response to the second level question based on the password. At block 725, based on the accuracy of the response, the server computing system may establish a login session for the user. As mentioned above, there may be multiple second level questions and responses to second level questions. In those situations, the encryption of the questions and the decryption of the responses may be the same.

Figure 8A:
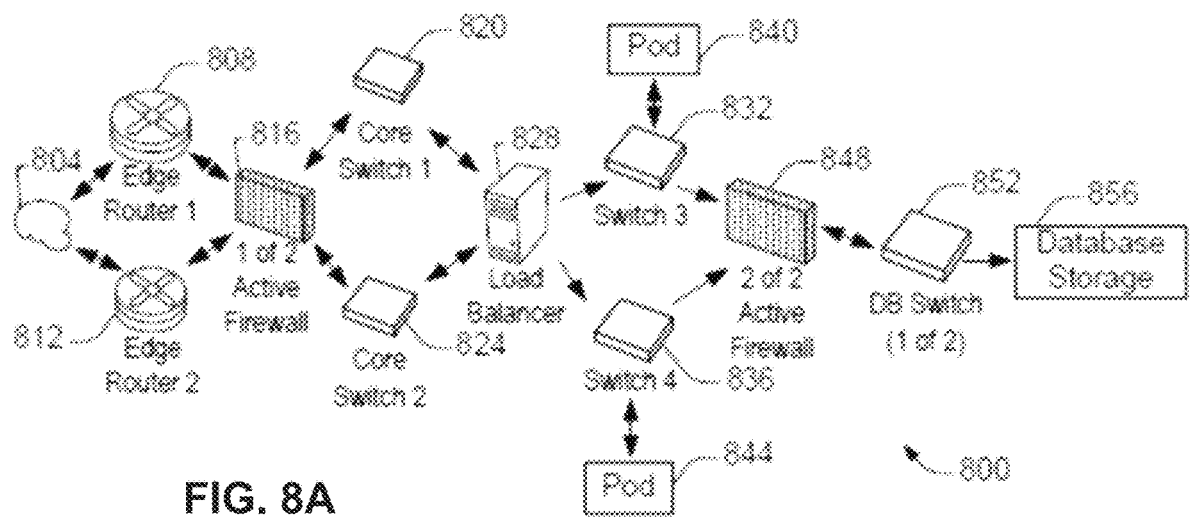
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
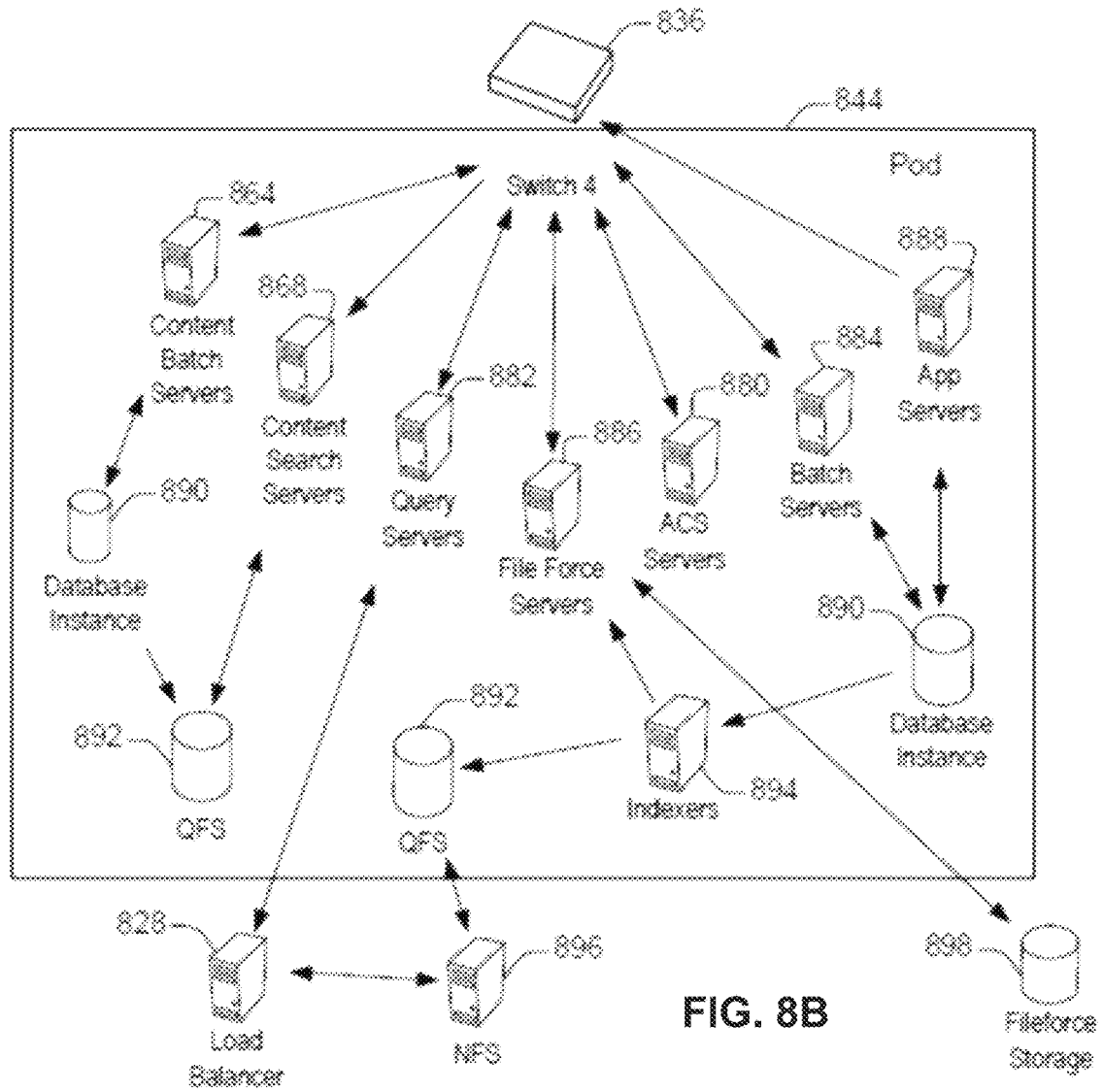
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to Fileforce servers 886 and/or the QFS 892.

Figure 9:
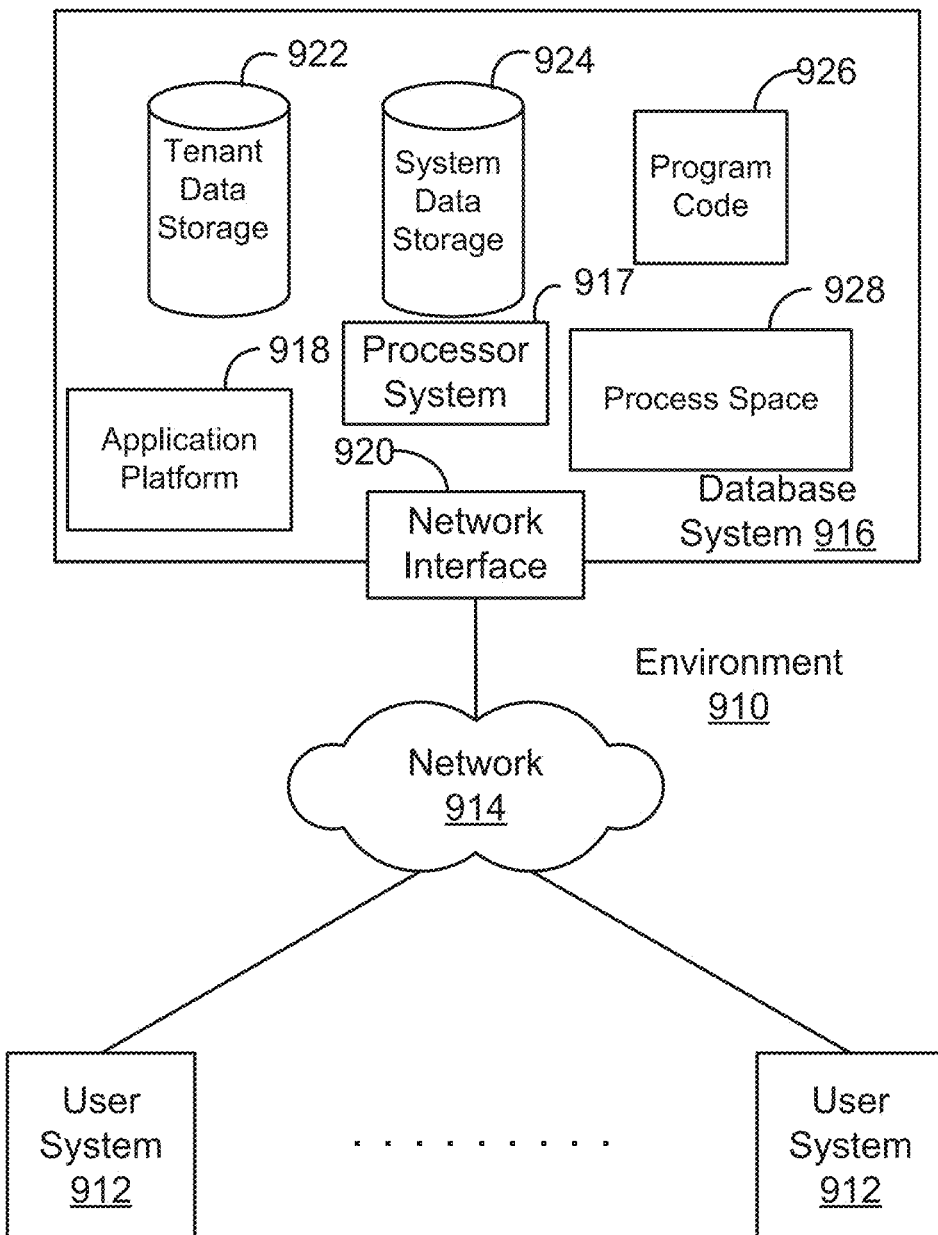
FIG. 9 shows a system diagram illustrating the architecture of a multi-tenant database environment, in accordance with some embodiments.
Figure 10:
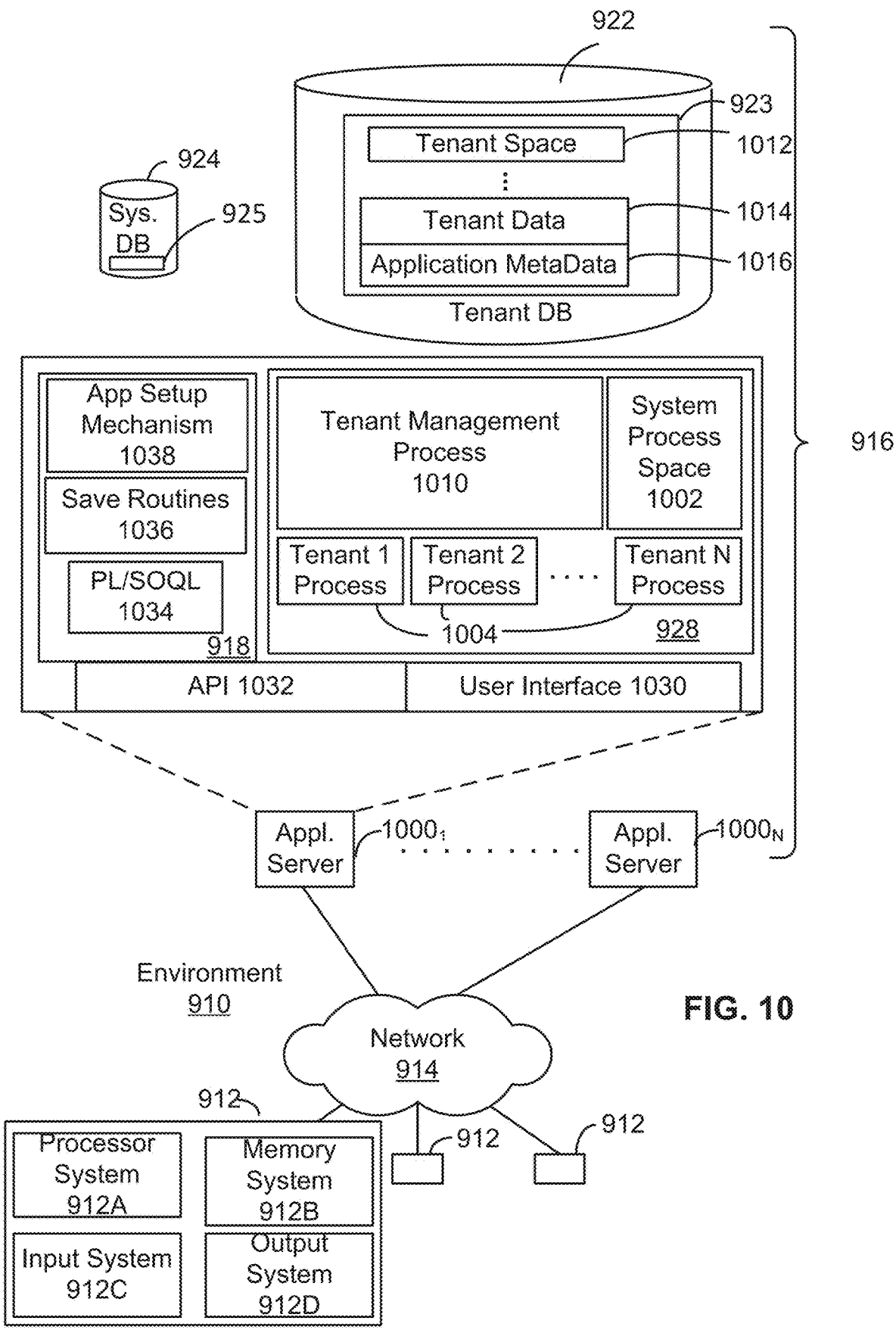
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method comprising:
   encrypting, by a server computing system, after successful verification of a user's identification and a first password associated with the user a question previously answered by the user during registration;
   transmitting, by the server computing system, the encrypted question to a user computing system;
   receiving, by the server computing system, an encrypted response from the user computing system, the encrypted response associated with the encrypted question;
   decrypting, by the server computing system, the encrypted response based on the first password to generate a response; and
   establishing, by the server computing system, a login session with the user computing system based on successful verification of the response.

2. The method of claim 1, wherein the user identification is received from the user computing system in a login request, and wherein the first password associated with the user is not included in the login request.

3. The method of claim 2, wherein said encrypting and decrypting by the server computing system are based on a hashed password generated from the first password, the hashed password stored in a database associated with the server computing system.

4. The method of claim 3, wherein the encrypted response is generated based on a second password associated with the user, the second password stored in the user computing system and is derived from the first password.

5. The method of claim 4, wherein the encrypted response is generated based on a hashed password generated from the second password.

6. The method of claim 5, wherein the encrypted question transmitted by the server computing system is decrypted by the user computing system based on the hashed password generated from the second password.

7. The method of claim 6, wherein a hashing function used by the server computing system is the same as a hashing function used by the user computing system.

8. A system comprising:
one or more processors; and
a non-transitory computer readable medium storing a plurality of instructions, which when executed, cause the one or more processors of a server computing system to:
encrypt, after successful verification of a user's identification and a first password associated with the user a question previously answered by the user during registration;
transmit the encrypted question to a user computing system;
receive encrypted response from the user computing system, the encrypted response associated with the encrypted question;
decrypt the encrypted response based on the first password to generate a response; and
establish a login session with the user computing system based on successful verification of the response.

9. The system of claim 8, wherein the user identification is received from the user computing system in a login request, and wherein the first password associated with the user is not included in the login request.

10. The system of claim 9, wherein said encrypting and decrypting by the server computing system are based on a hashed password generated from the first password, the hashed password stored in a database associated with the server computing system.

11. The system of claim 10, wherein the encrypted response is generated based on a second password associated with the user, the second password stored in the user computing system and is derived from the first password.

12. The system of claim 11, wherein the encrypted response is generated based on a hashed password generated from the second password.

13. The system of claim 12, wherein the encrypted question transmitted by the server computing system is decrypted by the user computing system based on the hashed password generated from the second password.

14. The system of claim 13, wherein a hashing function used by the server computing system is the same as a hashing function used by the user computing system.

15. A computer program product comprising a non-transitory computer-readable medium having computer-readable program code embodied therein to be executed by one or more processors, the program code including instructions to:
encrypt, after successful verification of a user's identification and a question based on a first password associated with the user question previously answered by the user during registration;
transmit the encrypted question to a user computing system;
receive encrypted response from the user computing system, the encrypted response associated with the encrypted question;
decrypt the encrypted response based on the first password to generate a response; and
establish a login session with the user computing system based on successful verification of the response.

16. The computer program product of claim 15, wherein the user identification is received from the user computing system in a login request, and wherein the first password associated with the user is not included in the login request.

17. The computer program product of claim 16, wherein said encrypting and decrypting are based on a hashed password generated from the first password, the hashed password stored in a database.

18. The computer program product of claim 17, wherein the encrypted response is generated based on a second password associated with the user, the second password stored in the user computing system and is derived from the first password.

19. The computer program product of claim 18, wherein the encrypted response is generated based on a hashed password generated from the second password.

20. The computer program product of claim 19, wherein the encrypted question transmitted is decrypted by the user computing system based on the hashed password generated from the second password, and wherein a hashing function used is the same as a hashing function used by the user computing system.

* * * * *